(12) United States Patent
Lonsdorfer et al.

(10) Patent No.: US 8,512,620 B2
(45) Date of Patent: Aug. 20, 2013

(54) METHOD AND DEVICE FOR THE MANUFACTURE OF A COMPONENT

(75) Inventors: Georg Lonsdorfer, Stade (DE); Hauke Seegel, Nahrendorf (DE); Klaus Rode, Oberhaching (DE)

(73) Assignee: Airbus Operations GmbH, Hamburg (DE)

( * ) Notice: Subject to any disclaimer, the term of this patent is extended or adjusted under 35 U.S.C. 154(b) by 176 days.

(21) Appl. No.: 12/980,456

(22) Filed: Dec. 29, 2010

(65) Prior Publication Data

US 2011/0156309 A1    Jun. 30, 2011

Related U.S. Application Data

(60) Provisional application No. 61/290,522, filed on Dec. 29, 2009.

(30) Foreign Application Priority Data

Dec. 29, 2009   (DE) .......................... 10 2009 060 707

(51) Int. Cl.
    *B29C 41/46*    (2006.01)
(52) U.S. Cl.
    USPC ........... 264/319; 264/257; 264/258; 264/299; 264/320; 264/324; 249/83; 425/394; 425/412

(58) Field of Classification Search
    USPC ................. 264/257, 258, 299, 319, 320, 324; 249/83; 425/394, 412
    See application file for complete search history.

(56) References Cited

U.S. PATENT DOCUMENTS

| | | | |
|---|---|---|---|
| 7,056,402 B2 | 6/2006 | Koerwien et al. | |
| 2010/0263789 A1 | 10/2010 | Graeber | |

FOREIGN PATENT DOCUMENTS

| | | |
|---|---|---|
| DE | 102007058727 A1 | 6/2009 |
| DE | 102008011410 A1 | 9/2009 |
| DE | 102008028865 A1 | 12/2009 |
| EP | 1031406 A1 | 8/2000 |
| EP | 2119544 A1 | 11/2009 |
| WO | WO 02/42044 A1 | 5/2002 |
| WO | WO 2008/073164 A2 | 6/2008 |

*Primary Examiner* — Christina Johnson
*Assistant Examiner* — Saeed Huda
(74) *Attorney, Agent, or Firm* — Leydig, Voit & Mayer, Ltd.

(57) ABSTRACT

A method of manufacturing a component from a composite-fiber-material semifinished product includes providing a forming support having a contour including at least one section corresponding to a surface of the manufactured component. The semifinished product is placed onto the forming support and the semifinished product is formed such that the semifinished product contacts the forming support. Further, a device form manufacturing component includes the forming support having the contour including at least one section corresponding to the surface of the manufacture component.

10 Claims, 13 Drawing Sheets

METHOD AND DEVICE FOR THE MANUFACTURE OF A COMPONENT

CROSS REFERENCE TO RELATED APPLICATIONS

This application claims priority from U.S. Provisional Patent Application Ser. No. 61/290,522, filed Dec. 29, 2009 and German Patent Application No. DE 10 2009 060 707.2, filed Dec. 29, 2009, each of which are hereby incorporated by reference herein in their entirety.

FIELD

The invention relates to a method for the manufacture of a component from a composite-fiber-material semi-finished product, and to a device for the manufacture of the component.

BACKGROUND

In aircraft engineering the manufacture of components comprising composite-fiber-material semifinished products, in particular preform components for stringers and clips comprising carbon-fiber-reinforced plastic (CFRP) components, often takes place by means of a pultrusion method. In such a continuous manufacturing process, for example that which is described in DE 10 2008 011 410 A1, a semifinished product comprising a composite-fiber material with a thermoplastic binder is moved along a feed direction and is formed in a quasi-continuous manner by means of a forming unit.

Such a continuous manufacturing method is associated with a disadvantage in that the preform components cannot be constructed with a variation of the layer construction in longitudinal direction of the profiles. Consequently, after mechanical cutting to length, the components have a constant thickness also in edge regions. This lack of taper results in a critical rigidity discontinuity in the transition region of the component to its subsequent joining partner, for example a fuselage shell or the like.

SUMMARY

An aspect of the present invention is to create a method and a device for the manufacture of a component, in which method and device a variable layer construction in longitudinal direction of the component is possible with a minimum of production-related expenditure.

In an embodiment, the present invention provides a method of manufacturing a component from a composite-fiber-material semifinished product. The method includes providing a forming support having a contour including at least one section corresponding to a surface of the manufactured component. The semifinished product is placed onto the forming support and the semifinished product is formed such that the semifinished product contacts the forming support. In another embodiment, the invention provides a device for manufacturing a component from a composite-fiber-material semifinished product. The device includes a forming support having a contour including at least one section corresponding to a surface of the manufactured component and configured such that the semifinished product contacts the contour of the forming support during manufacturing.

BRIEF DESCRIPTION OF THE DRAWINGS

Exemplary embodiments of the invention are explained in more detail below with reference to schematic drawings, in which.

DETAILED DESCRIPTION

A method according to an embodiment of the invention for the manufacture of a component, in particular of a preform, from a composite-fiber-material semifinished product comprises the following steps:

a) placing the semifinished product onto a forming support which comprises a contour that corresponds at least in some sections to what will later become the component; and b) forming the semifinished product, wherein the semifinished product is made to contact the forming support.

According to the invention a variable layer construction of the preform in longitudinal direction can be achieved so that a continuous transition, for example from a stringer or clip to the fuselage shell, is established, and consequently a rigidity discontinuity is avoided.

In a preferred embodiment of the invention the support is an angle profile, preferably an L-profile. The transition of the two flanges of the L-profile can comprise a radius that corresponds to the radius of the preform to be produced, for example of a stringer profile or a clip profile. The angle profile is preferably removable so that two L-profile supports can be assembled so as to form a T-profile, for example for a T-stringer. The stringers and/or clips that have been made using the preform technique can subsequently be arranged on a fuselage shell and by means of an infusion technique together with the shell can be infiltrated with matrix material and can be hardened. This saves the very high costs of providing rivet connections in this region.

In a preferred exemplary embodiment of the invention, individual layers comprising woven materials and/or non-crimp fabrics (NCF), preferably woven materials and/or non-crimp fabrics comprising carbon, glass and/or aramid are tailored and applied as a semifinished product to a bearing surface of the support. The semifinished products preferably comprise a thermoplastic binder, for example in the form of powder or in the form of a film. As an alternative, a duroplastic plastic can be used as a binder.

The individual layers are preferably cut to length and width. It is particularly advantageous if the individual layers are cut to a format that tapers off in the direction away from the bearing surface so that tapering in the edge region is achieved. In this way during the later arrangement of the preform profiles, for example on a fuselage shell of an aircraft, a harmonious transition without rigidity discontinuity is achieved. During infusion of the stringer preforms and/or clip preforms placed onto the skin field, material accumulation is prevented because of the gentle transition of the base sections of the stringers and/or clips to the skin field. Furthermore, by means of the preferred laying sequence from large to small, the laying sequence of the individual layers can be visually controlled in a simple manner.

According to a preferred embodiment of the invention, a molded part is arranged on the support prior to placement of the semifinished product, wherein a surface of the molded part together with the top of the support forms a shared bearing surface for the semifinished product. The geometry of the molded part is preferably selected in such a manner that the surface of the molded part finishes flush with the top of the angle profile, thus forming a shared plane. As a result of this the semifinished product can easily be positioned on the support from the point of view of production technology. Prior to the forming of the semifinished product the molded part is removed so that a web of the preform is exposed and can easily be formed.

The support is preferably positioned between two cheeks that extend perpendicularly to a base plate on a contact surface of the base plate. The cheeks can differ in height; they preferably extend so as to be parallel to each other. The support is preferably arranged on the base plate so as to be removable so that the manufacturing device is flexibly adaptable to different component geometries. The cheeks can be screwed to, and/or pinned to, the contact surface of the base plate.

From the point of view of production technology it has been proven to be advantageous if between the cheek and the support a triangular profile is arranged whose supporting surface facing the semifinished product extends so as to be approximately perpendicular to the surface of the support.

Preferably, an end stop is arranged between the triangular profile and the semifinished product on the surface of the support so as to form an end stop surface for the semifinished product. The end stop, which is for example made of sheet metal, makes it possible to flexibly change the web height of the preform profile. This makes it possible to precisely manufacture the height of the stringer webs or clip webs and thus makes possible manufacture to final dimensions, at least, however, manufacture close to final dimensions. Mechanically reworking the preform profiles following the preform process can be done without so that production-related expenditure is considerably reduced.

It has been shown to be particularly advantageous if a pressure piece is arranged in the region of a limb of the support for fixing the semifinished product. The pressure piece is essentially designed as a rectangular profile that connects at the face to the triangular profile and to the end stop and that extends approximately to the transition region of the two flanges of the L-profile. In this manner the position of the web of the preform profile can be fixed so that wrinkling is prevented during the subsequent forming process.

In a preferred method, forming the preform profile takes place by means of a forming piece whose first end section can be brought to contact the pressure piece, and whose second end section can be brought to contact the cheek. In particular, by separation of the forming piece and the pressure piece, some stretching of the fiber layers and impeccable wrinkle-free formation of the radii of the woven fabric is achieved. The preform can be prefabricated to final dimension thickness. When compared to a vacuum method, there is no need to provide auxiliaries, for example a membrane and sealing tapes, which auxiliaries are expensive to purchase and expensive to dispose of.

Preferably, by means of a modular design of the manufacturing device by coupling the segments such as the support, cheeks, triangular profile, end stop etc., reduced manufacturing expenditure is achieved when the component geometry is changed. The segments are designed as elements that from the point of view of production technology can be produced in a simple manner and can be installed with little expenditure. Consequently the device according to the invention overall ensures good potential for automation.

After completion of the forming process, the manufacturing device is preferably placed in a heating oven. Under the effect of thermal exposure the layers of woven fabric, which comprise a thermoplastic and/or duroplastic binder, are bonded. As an alternative or in addition, in particular in the case of large numbers to be manufactured, a dedicated heating device of the tool in combination with cooling of the complete tool is advantageous. After cooling, the preform, which is preferably manufactured to final dimensions, is removed.

A device according to the invention for the manufacture of a component, in particular of a preform, from a composite-fiber-material semifinished product uses a forming support whose contour corresponds to the subsequent component at least in some sections, wherein the semifinished product to form the component can be made to contact the support.

Between the support, which is preferably an angle profile, for example an L-profile, and the cheek, a molded part can be arranged in such a manner that a surface of the molded part, together with the top of the support, forms a shared bearing surface for the semifinished product, so that positioning of the semifinished product is facilitated. After the semifinished product has been put in place, the molded part can be removed.

Figure 1:
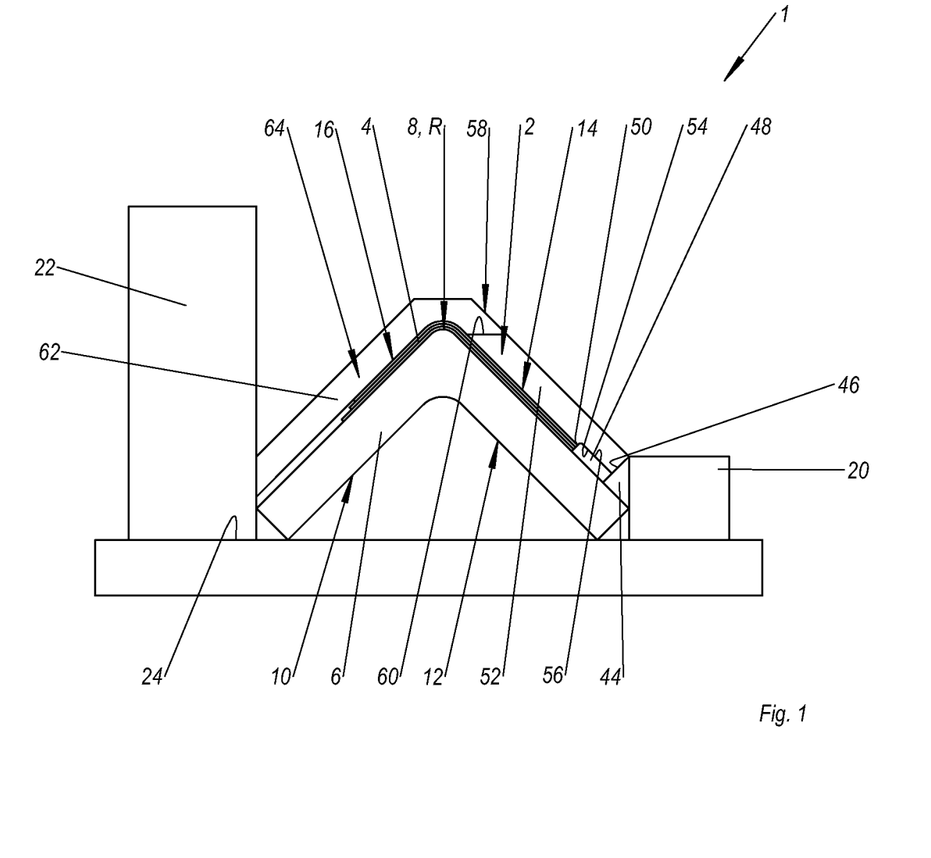
FIG. 1 is a section view of a device for the manufacture of a preform according to an embodiment of the invention.

FIG. 1 shows a section view of a manufacturing device 1 according to an embodiment of the invention for the manufacture of a component 2 from a composite-fiber-material semifinished product 4. In the exemplary embodiment shown the device is used for the manufacture of an L-profile preform 2. The manufacturing device comprises a forming support 6 whose contour corresponds to what will later become the preform 2. The forming support 6 is designed as an L-shaped angle profile, wherein the transition 8 of the two flanges 10, 12 of the L-shaped angle profile 6 comprises a radius R that corresponds to the radius of the preform 2 to be produced. The exemplary embodiment shows the manufacture of an L-shaped stringer preform 2 with a web 14 and a stringer base 16.

In this arrangement the method for the manufacture of the preform 2 from the composite-fiber-material semifinished product 4 comprises the following steps:
 a) placing the semifinished product 4 onto the forming support 6; and
 b) forming the semifinished product 4, wherein the semifinished product is made to contact the forming support 6.

This is explained in more detail below with reference to FIGS. 2 to 9 that show steps of the method according to this embodiment of the invention.

Figure 2:
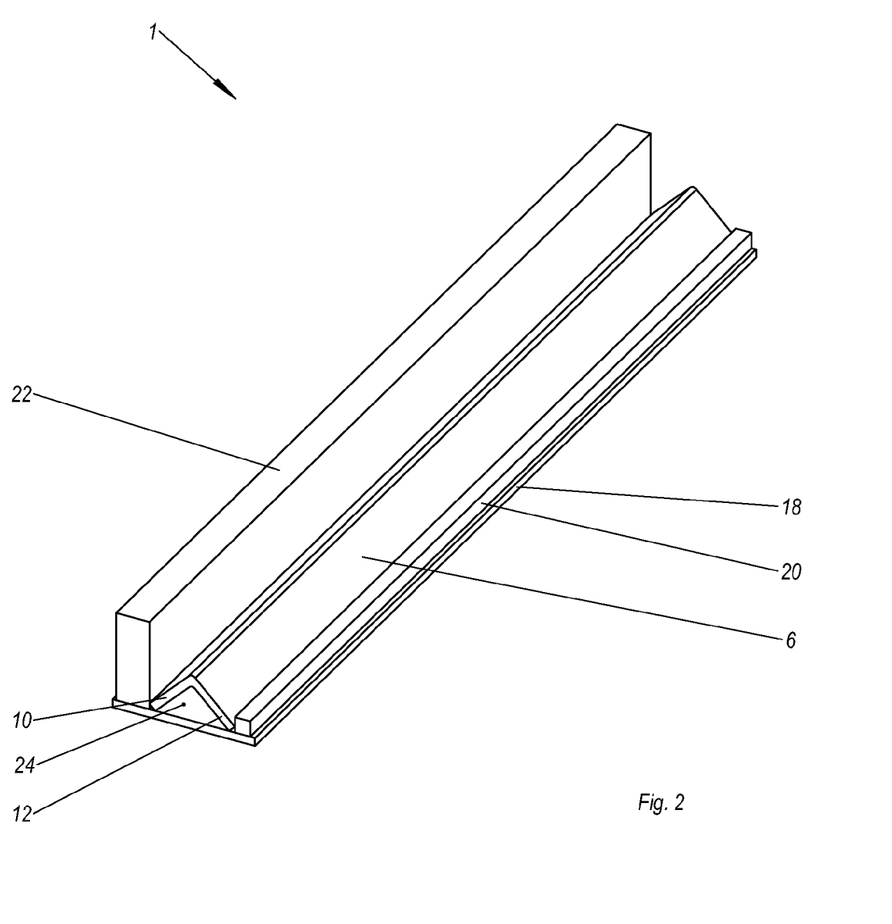
FIGS. 2 to 5 and 7 to 9 are spatial representations of the device of FIG. 1 with reference to the manufacturing steps.

As shown in particular in FIG. 2, which depicts a spatial representation of the device 1, the latter essentially comprises an approximately rectangular base plate 18 with two cheeks 20, 22 that extend so as to be perpendicular to the base plate, which cheeks 20, 22 in the region of the longitudinal sides are arranged on a contact surface 24 of the base plate 18. The cheeks 20, 22 extend parallel to each other and comprise a rectangular cross section of different heights. The cheeks 20, 22 are pinned to the base plate 18 and are screwed to it. The angle profile 6 is positioned between the cheeks 20, 22 on the contact surface 24 of the base plate 18. In this arrangement the two flanges 10, 12 of the L-angle profile 6 rest against the contact surface 24 and in each case contact one of the cheeks 20, 22. The angle profile 6 is thus removably arranged on the base plate 18 so that the manufacturing device 1 can be more flexibly adapted to various component geometries.

Figure 3:
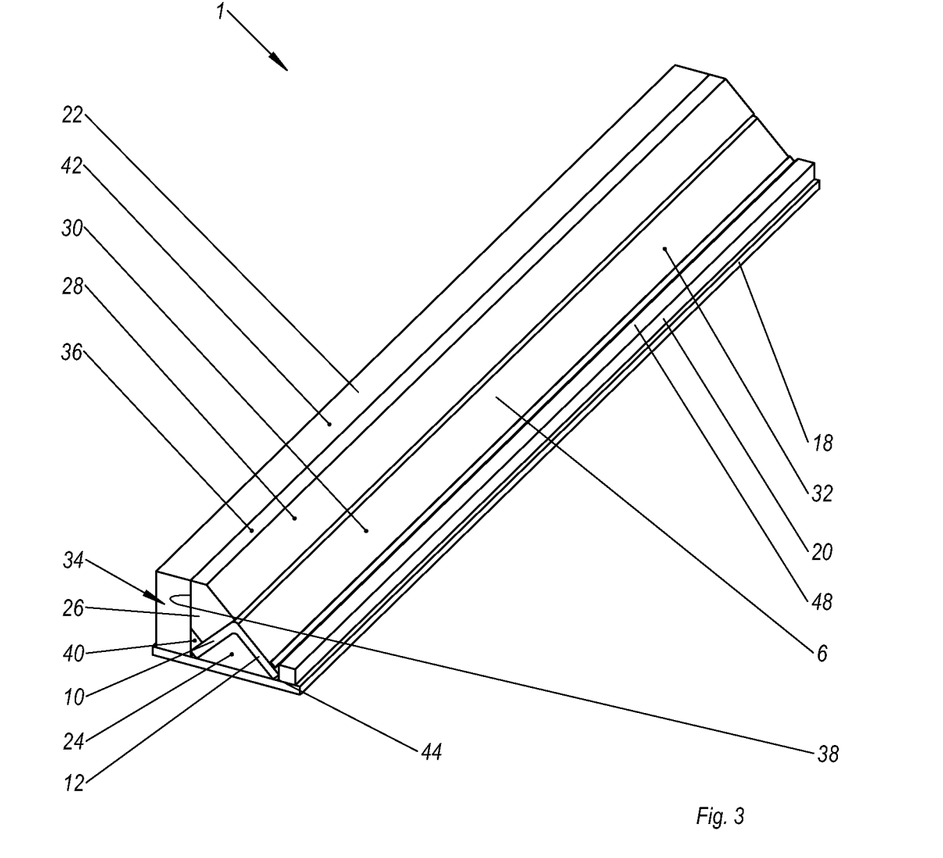

As shown in FIG. 3, which depicts a spatial view of the device 1, a molded part 26 is arranged on the angle profile 6 in such a manner that a surface 28 of the molded part 26, together with a top 30 of the angle profile 6, forms a shared bearing surface 32 for the semifinished product 4. To this effect the molded part 26 contacts the flange 10 of the angle profile 6 and the cheek 22, wherein an end section 34 of the molded part 26 comprises two bevelled faces 36, 38, of which the bevelled face 38 rests against a lateral surface 40 of the cheek 22 while the second lateral surface 36 extends so as to be flush with an end face 42 of the cheek 22.

Between the cheek 20 and the angle profile 6 a triangular profile 44 (see also FIG. 1) is arranged, whose supporting surface 46 (see FIG. 1) that faces the semifinished product 4 extends so as to be approximately perpendicular to the surface of the angle profile 6.

Furthermore, an end stop 48 is arranged between the triangular profile 44 and the semifinished product 4 on the surface of the angle profile 6 for forming an end stop surface 50 (see FIG. 1) for the semifinished product 4. The end stop 48, which comprises, for example, sheet metal, makes it possible to flexibly alter the web height of the preform.

Figure 4:
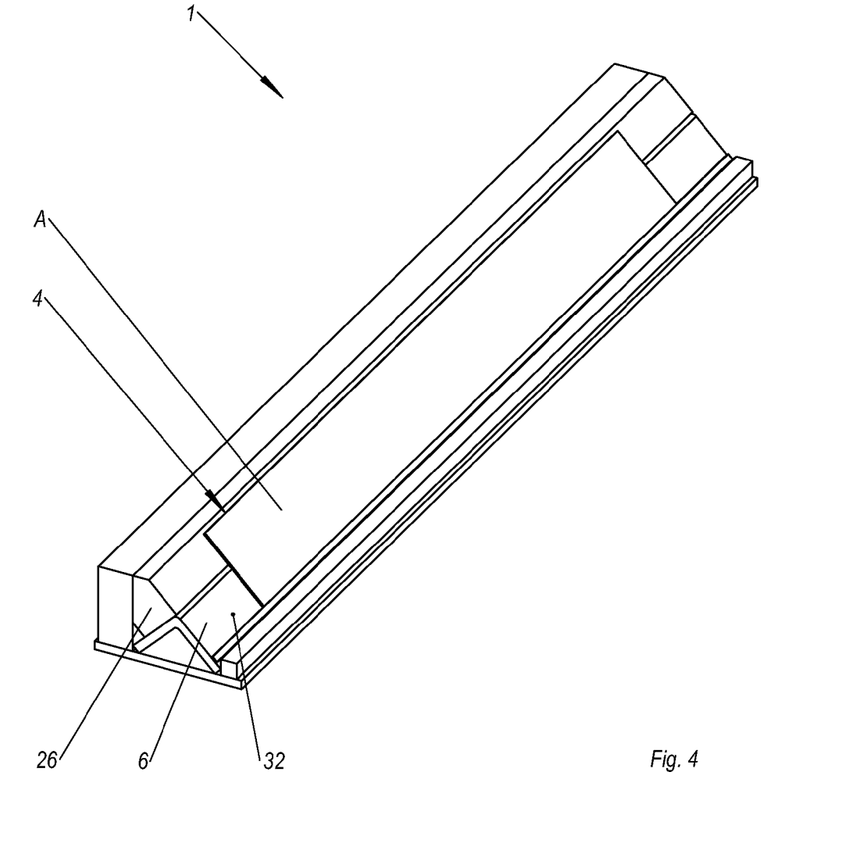
Figure 5:
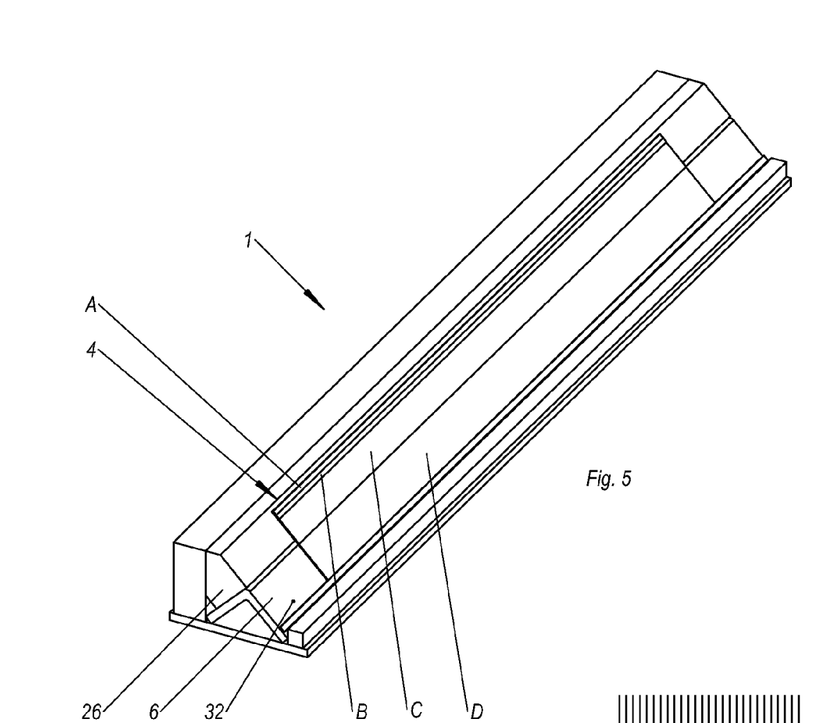

Subsequently, the semifinished product 4 is applied in layers to the bearing surface 32 shared by the angle profile 6 and the molded part 26. In FIG. 4 the laying of a first layer A is shown as an example. FIG. 5 shows as an example of the laying of further layers B, C and D. Layer D is designed as a unidirectional layer (UD layer) that is arranged only in the web region of the stringer to be produced. Individual layers of a woven carbon fiber fabric, tailored to size, are applied as a semifinished product to the bearing surface, which layers comprise a thermoplastic binder. The individual layers are cut to length and width. The individual layers are tailored to a format that tapers off in the direction away from the bearing surface so that a taper is achieved in the edge region. Consequently, during later application of the preforms 2, for example to a fuselage shell of an aircraft, a harmonious transition without rigidity discontinuity and with good visual appearance is achieved. Furthermore, as a result of this the laying sequence of the individual layers is simple to control.

Figure 6:
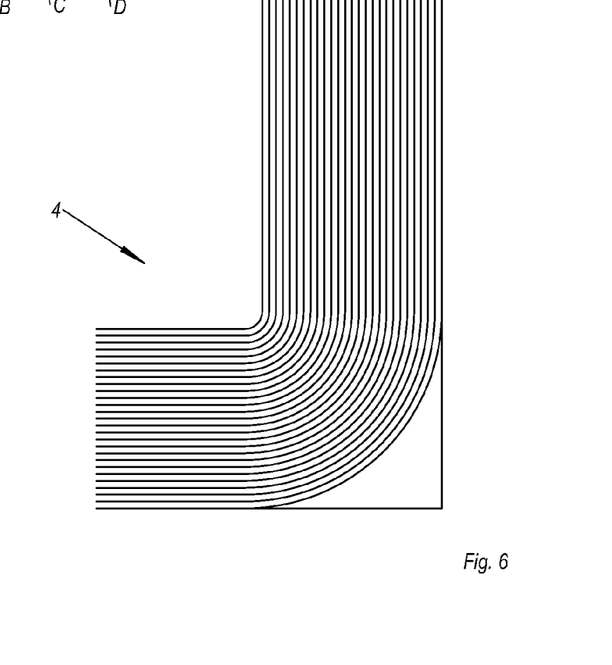
FIG. 6 is a section view of the layer construction of a preform.

FIG. 6 shows a concrete layer design of an L-profile-preform 2. The layer construction comprises a total of 28 layers of continuous +/−45° and 0/90° layers as well as 0° UD tapes that are only arranged in the region of the stringer web. Cutting out the layers is achieved on a cutter, wherein an overmeasure of approximately 10 mm is provided both in length and in width.

Figure 7:
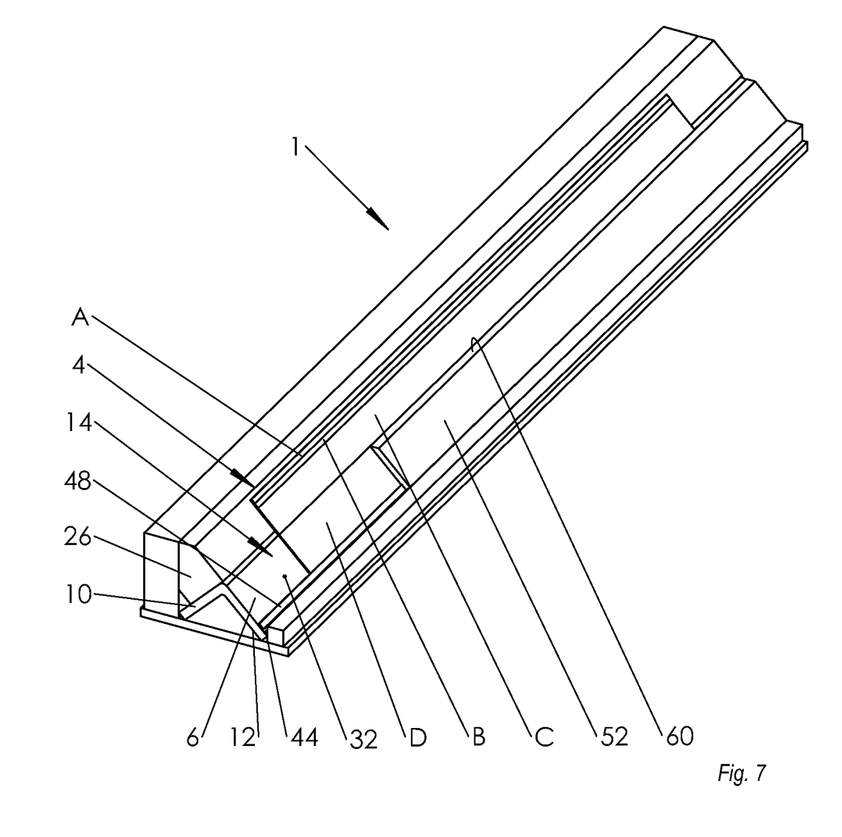

According to FIG. 7, which shows a spatial presentation of the device 1, a pressure piece 52 is arranged in the region of the web 14 of the preform 2 in order to fix said preform 2. The pressure piece 52 is essentially designed as a rectangular profile that connects at the face to the triangular profile 44 and to the end stop 48 and that extends approximately to the transition region 8 of the two flanges 10, 12 of the L-angle profile 6 (see FIG. 1). Consequently the position of the web 14 of the preform 2 is fixed so that wrinkling is prevented during subsequent forming. In the region of the end stop 48 the pressure piece 52 comprises a notch 54, rests against an outside surface 56 of the end stop 48, and is supported by the end stop surface 50 of the end stop 48 (see FIG. 1). An end section 58 of the pressure piece 52 comprises a bevelled face 60, which in the installed state extends so as to be approximately horizontal and parallel to the contact surface 24 of the base plate 18.

Figure 8:
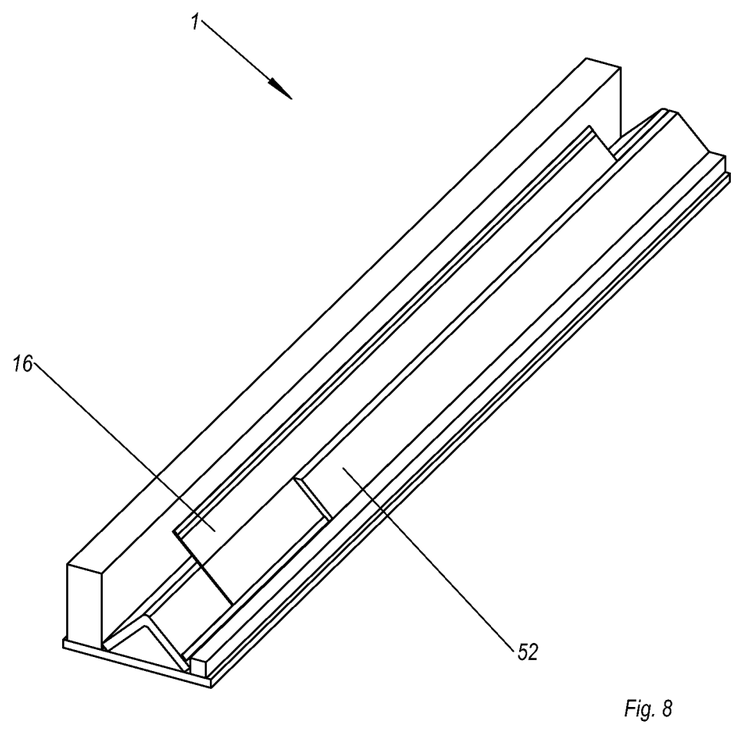

As shown in FIG. 8, the molded part 26 is removed after the pressure piece 52 has been put in place. Consequently, what will later become the stringer base 16 of the preform 2 is exposed and can be formed.

Figure 9:
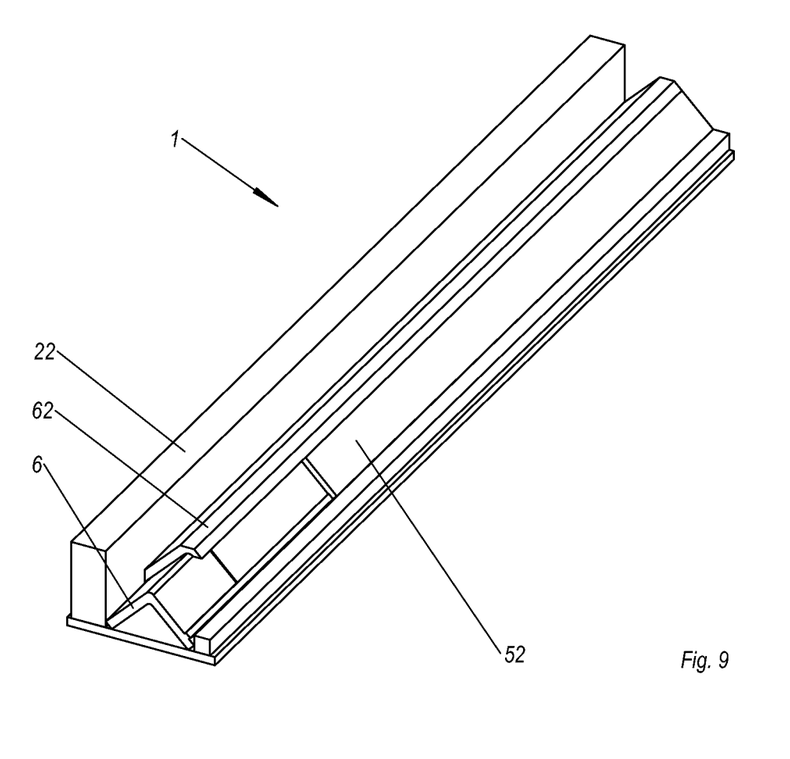

Forming the now exposed semifinished-product stringer base 16 according to FIG. 9 takes place in one pass by means of a forming piece 62 whose first end section can be brought to contact the bevelled face 60 of the pressure piece 52 and whose second end section can be brought to contact the cheek 22 (compare also FIG. 1). In particular, by separation of the forming piece 62 and the pressure piece 52 some stretching of the fiber layers and impeccable wrinkle-free formation of the radii of the woven fabric is achieved (compare FIG. 1). The semifinished-product stringer base 16 is pressed so as to make contact with the forming angle profile 6.

After completion of the forming process, the manufacturing device 1 is placed in a heating oven. Under the effect of thermal exposure the layers of woven fabric, which comprise a thermoplastic binder, are bonded. After cooling, the preform 2, which has been manufactured to final dimensions and comprises a taper 64 (see FIG. 1) on the inside, is removed.

The preform 2 manufactured according to embodiments of the invention comprises good inherent rigidity, wherein the flexibility is adequate for it to conform to a curved fuselage shell.

Figure 10:
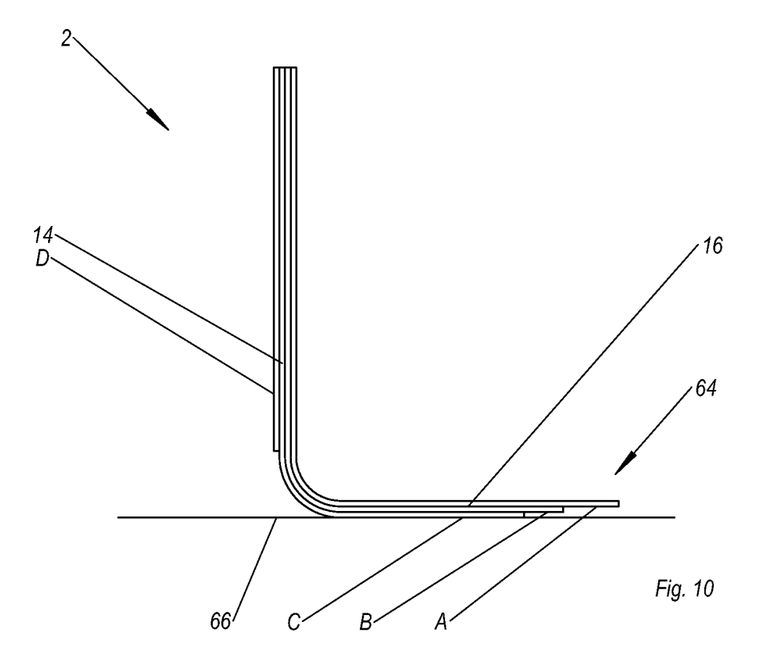
FIG. 10 is a diagrammatic view of the integration of the L-shaped preform stringers in a fuselage shell.

FIG. 10 shows the integration of the L-shaped preform stringer 2 in a fuselage shell 66, wherein the pressure pieces required for positioning the preform 2 on the shell 66 are not shown. By means of corresponding shaping of the pressure pieces the free ends of the layers A to C shown in the drawing are pressed against the shell 66. Due to the taper 64 on the inside a harmonious transition without rigidity discontinuity and with good visual appearance is achieved. The UD layer D is arranged in the region of the web 14. After infiltration and curing of the fuselage shell 66, a high-strength lightweight structure with integral L-shaped preform stringers 2 is achieved.

Figure 11:
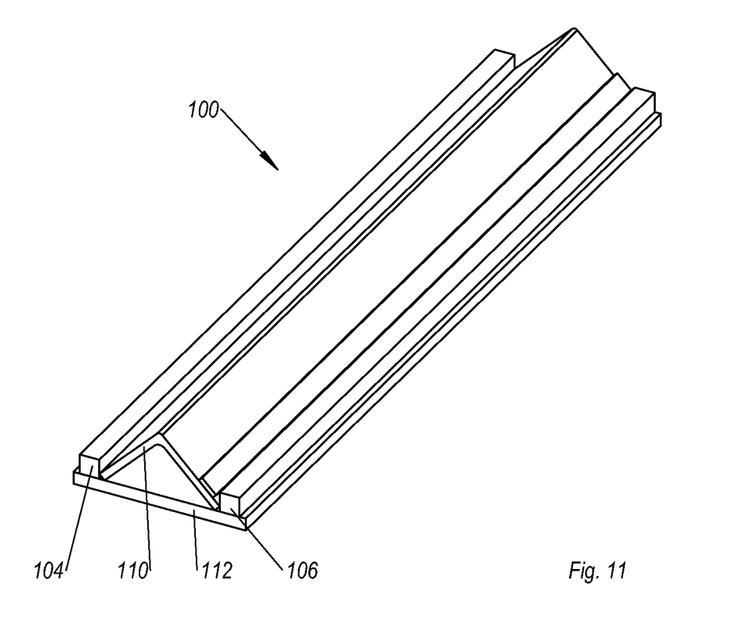
FIGS. 11 to 14 are spatial representations of a device for the manufacture of a preform according to another embodiment of the invention.
Figure 12:
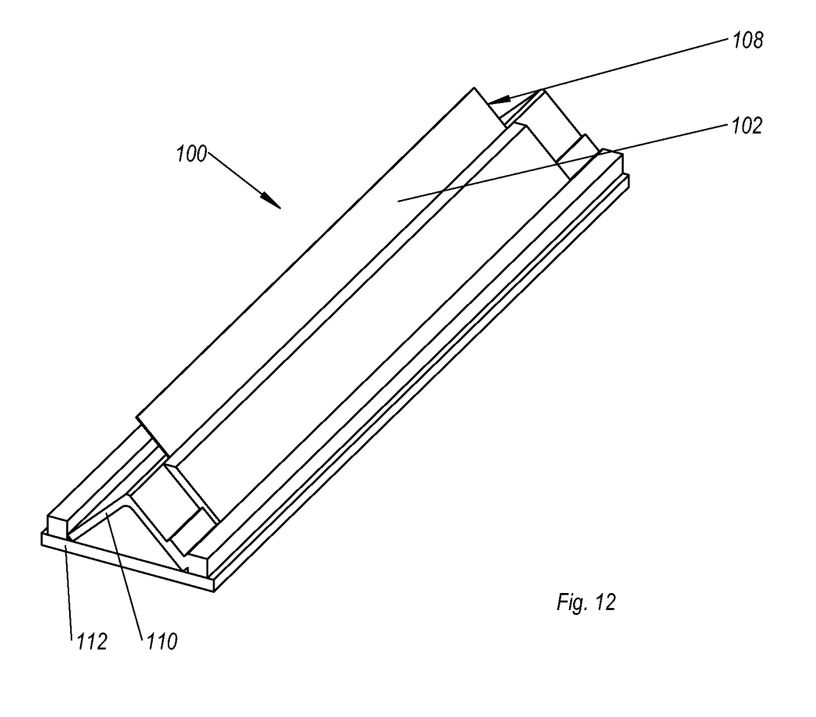
Figure 13:
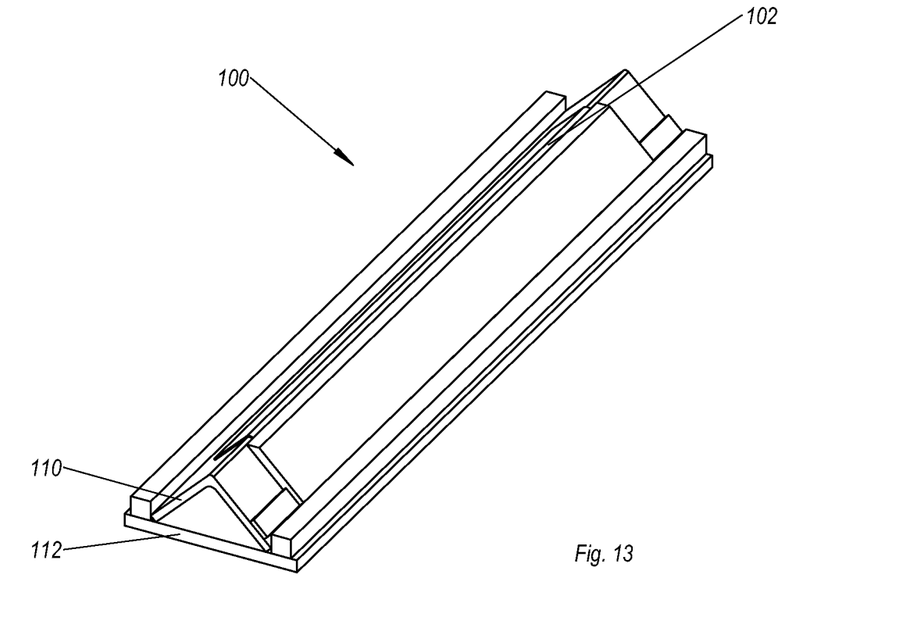

FIGS. 11, 12 and 13 show a further exemplary embodiment of a manufacturing device 100 according to the invention for the manufacture of an L-profile preform 102 to form stringer halves, which manufacturing device 100 differs from the device described above in that the cheeks 104, 106 are the same height. In this embodiment, forming the stringer base 108, shown in FIG. 11, of the preform 102 takes place by means of a heated forming tool, a so-called smoothing iron (not shown). FIG. 13 shows the device 100 with a preform 2 that has been completely formed on a forming angle profile 110.

Figure 14:
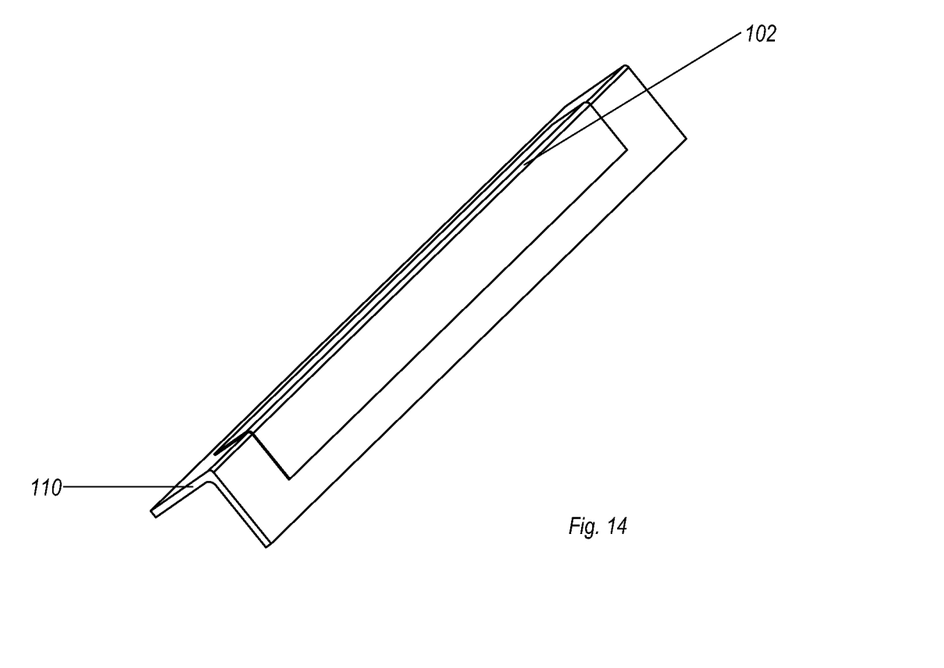

FIG. 14 shows the L-angle profile 110, which has been removed from the base plate 112, with a completely formed preform 2. The layers of semifinished product have been affixed by area-shaped ironing onto the angle profile 110.

Figure 15:
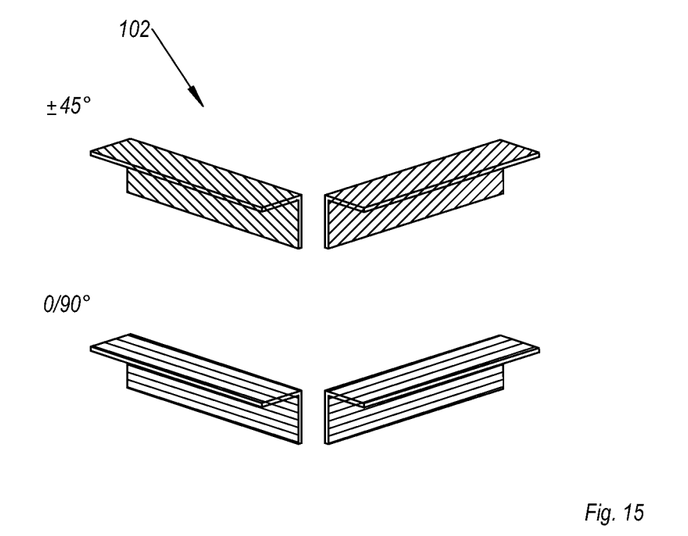
FIG. 15 is an illustration of the layer construction of the preform.

According to FIG. 15, several preforms 2 with different laying sequences are prefabricated to form mirrored stringer halves. In this arrangement the ±45° layers are laid so as to converge, or −/+45° layers are used on one side. 0/90° layers are laid on both stringer halves with identical orientation.

Figure 16:
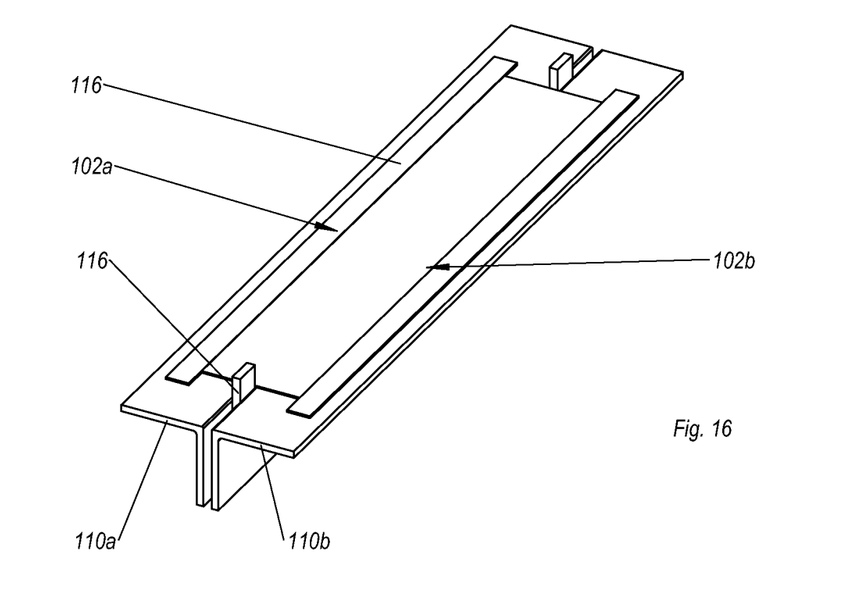
FIGS. 16 and 17 show two preforms, designed as L-shaped stringer halves, which have been made to contact each other and have been affixed on the web sides in order to form a T-stringer.
Figure 17:
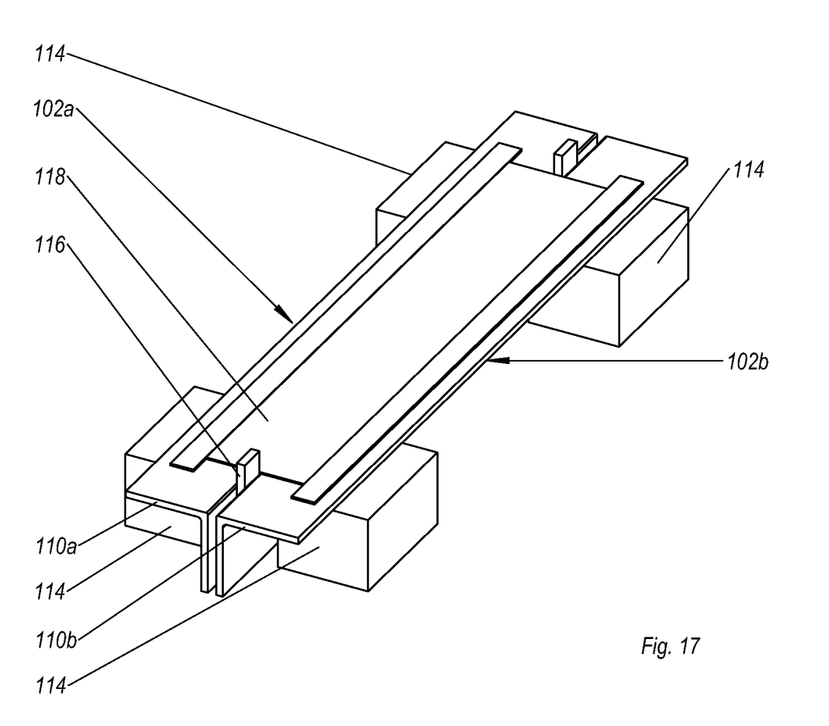

As shown in FIGS. 16 and 17 two such preforms 102a, 102b, prepared in such a manner as L-shaped stringer halves with mirrored position orientation, are made to rest against angle profiles 110a, 110b to form a T-shaped PVNCF-stringer on the web sides and are affixed. Spacers 116 have been provided for defining the space. During further processing, the clamped angle profiles 110a, 110b are supported by means of wooden blocks 114. At the radii of the angle profiles 110a, 110b a gusset filler with a radius of approximately 5 mm is used. Subsequently a cover plate 118 is placed on the stringer bases and is clamped against the angle profiles 110a, 110b. After jamming, the stringer is preferably compacted at a temperature of approximately 160° in order to reduce the setting path during later infusion of matrix material. To complete the compacted T-stringers to final dimensions, they are clamped between two pressure pieces and are cut to final size along the pressure pieces. Finally, infiltration of the T-stringers with matrix material can preferably take place with a build-up of vacuum, either individually or with a shell.

Disclosed is a method for the manufacture of a component, in particular of a preform 2, 102, from a composite-fiber-material semifinished product 4, according to which a semifinished product 4 is applied to a forming support 6, 110 with a contour that corresponds at least in some sections to what will later become the component 2, 102, wherein the semifinished product 4 is subsequently formed in such a manner that said semifinished product 4 is made to contact the forming support 6, 110. Furthermore disclosed is a device 1, 100 for the manufacture of such a component.

While the invention has been particularly shown and described with reference to preferred embodiments thereof, it will be understood by those skilled in the art that various changes in form and details may be made therein without departing from the spirit and scope of the invention.

LIST OF REFERENCE CHARACTERS

1 Manufacturing device
2 Component (preform)
4 Composite-fiber-material semifinished product
6 Support (angle profile)
8 Transition
10 Flange
12 Flange
14 Web
16 Stringer base
18 Base plate
20 Cheek
22 Cheek
24 Contact surface
26 Moulded part
28 Surface
30 Top
32 Bearing surface
34 End section
36 Bevelled face
38 Bevelled face
40 Lateral surface
42 End face
44 Triangular profile
46 Support surface
48 End stop
50 End stop surface
52 Pressure piece
54 Notch
56 Outside surface
58 End section
60 Bevelled face
62 Forming piece
64 Taper
66 Fuselage shell
100 Manufacturing device
102 Preform
104 Cheek
106 Cheek
108 Stringer base
110 Angle profile
112 Base plate
114 Wooden blocks
116 Spacers
118 Cover plate

What is claimed is:

1. A method of manufacturing a component from a composite-fiber-material semifinished product, the method comprising:
   providing a forming support having a contour including at least one section corresponding to a surface of the manufactured component;
   placing a semifinished product onto the forming support; and
   forming the semifinished product such that the semifinished product contacts the forming support,
   wherein the forming support is an angle profile, and further comprising positioning the angle profile on a contact surface of a base plate between two cheeks that extend perpendicularly to the base plate.

2. The method recited in claim 1, wherein the manufactured component is a preform.

3. The method recited in claim 1, further comprising arranging a triangular profile with a supporting surface between a first of the two cheeks and the angle profile such that the supporting surface faces the semifinished product and extends approximately perpendicular to a first surface of the angle profile.

4. The method recited in claim 3, further comprising arranging an end stop between the triangular profile and the semifinished product on the first surface of the angle profile so as to form an end stop surface for the semifinished product.

5. The method recited in claim 1, wherein placing the semifinished product includes applying layers of at least one of woven materials and non-crimp fabrics so as to form the semifinished product.

6. The method recited in claim 5, wherein the layers of at least one of woven materials and non-crimp fabrics include at least one of carbon, glass and aramid.

7. The method recited in claim 1, further comprising arranging a pressure piece in a region corresponding to a web of the manufactured component so as to fix the semifinished product.

8. The method recited in claim 1, further comprising, after forming the semifinished product, disposing the forming support and the semifinished product into a heating oven.

9. The method recited in claim 1, further comprising, after forming the semifinished product, heating the semifinished product using a dedicated heating device.

10. A method of manufacturing a component from a composite-fiber-material semifinished product, the method comprising:
    providing a forming support having a contour including at least one section corresponding to a surface of the manufactured component;
    placing a semifinished product onto the forming support
    forming the semifinished product such that the semifinished product contacts the forming support;
    before placing the semifinished product onto the forming support, arranging a molded part on the forming support, the molded part having a first surface that cooperates with a top of the forming support such that the first surface and the top of the forming support together define a shared bearing surface for the semifinished product; and before forming the semifinished product, removing the molded part.

\* \* \* \* \*